May 1, 1934.  G. G. HYDE  1,957,168
SEWAGE GRIT TREATMENT
Filed Feb. 6, 1931  2 Sheets-Sheet 1
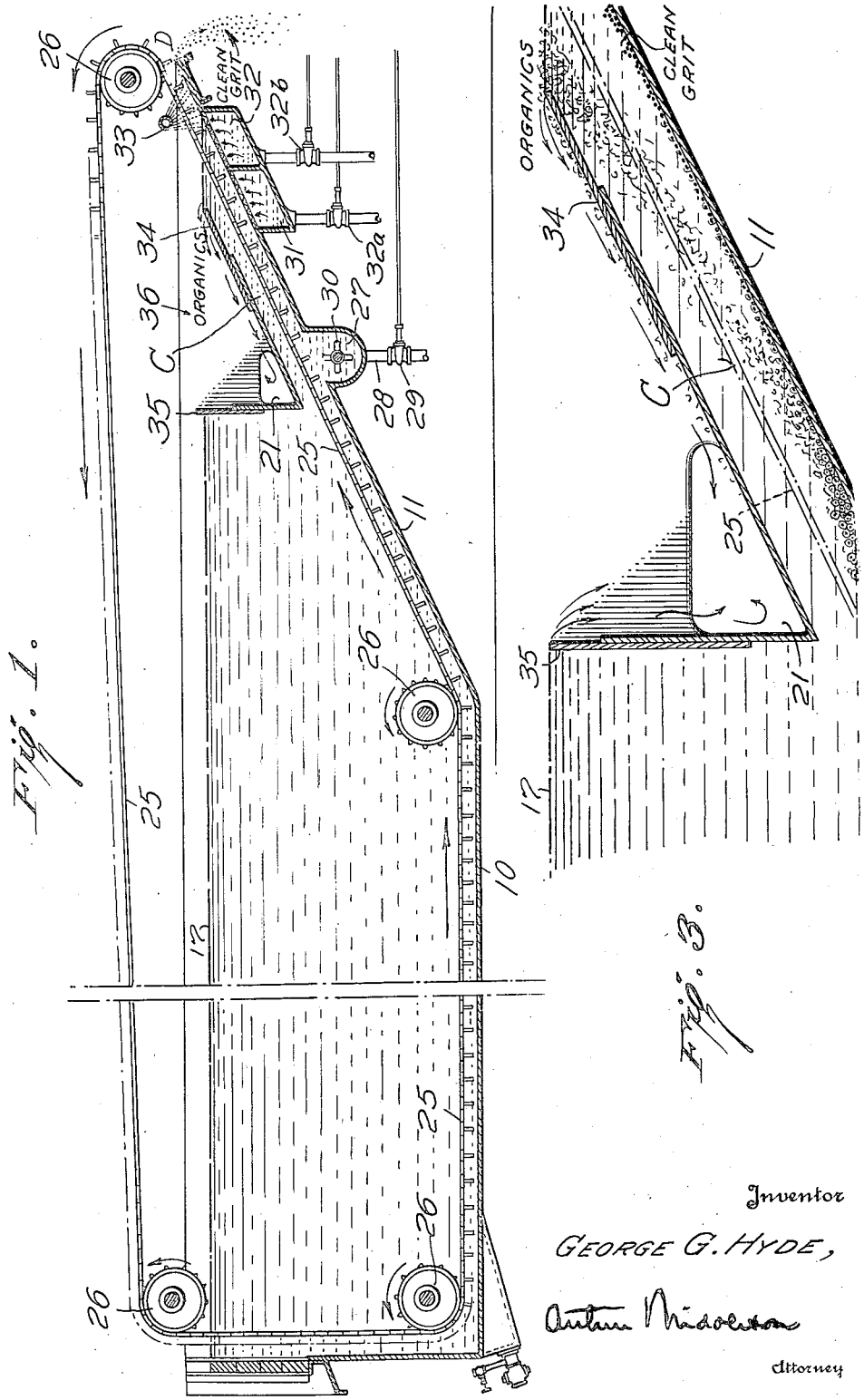
Inventor
GEORGE G. HYDE,
Attorney

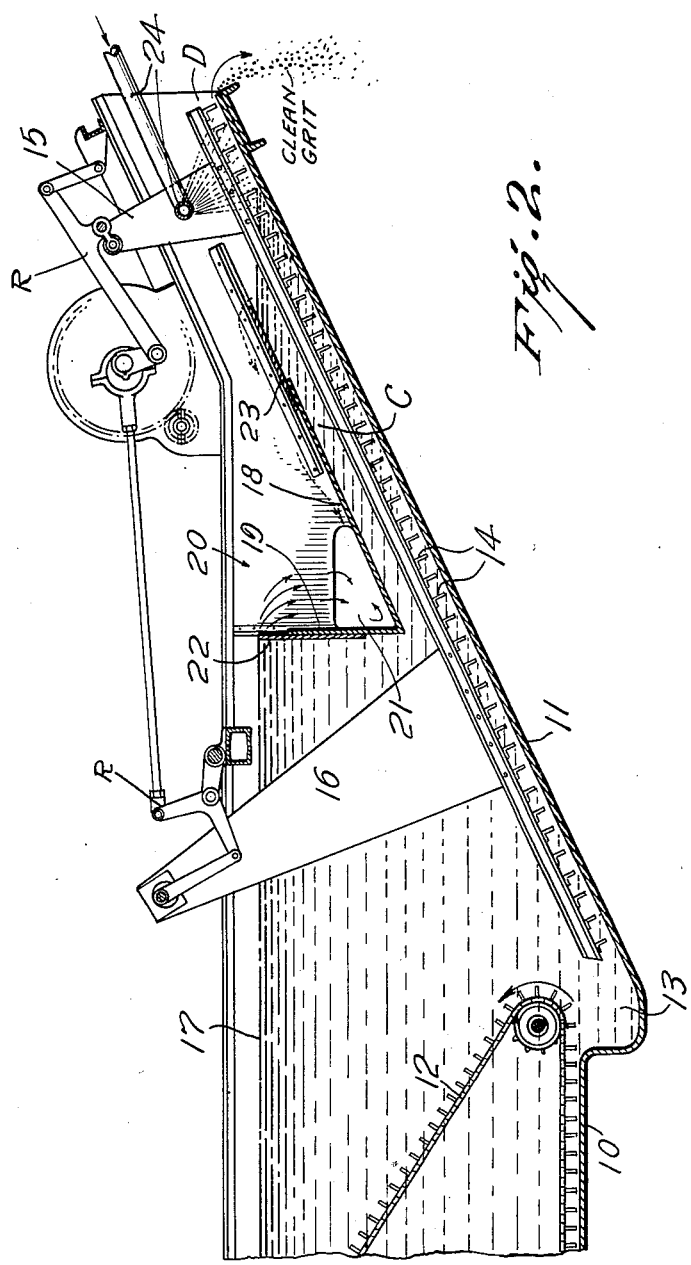

Patented May 1, 1934

1,957,168

UNITED STATES PATENT OFFICE 1,957,168

SEWAGE GRIT TREATMENT

George G. Hyde, New Rochelle, N. Y., assignor, by mesne assignments, to The Dorr Company, Inc., New York, N. Y., a corporation of Delaware Application February 6, 1931, Serial No. 513,813

4 Claims. (Cl. 210—3)

This invention relates to the separation from a wet mixture of certain materials of different kinds, which have a certain peculiar affinity for each other and therefore do not submit readily to the customary ways of classification or hydro-separation.

More particularly, the invention relates to sewage grit chambers wherein the inert grit is continually settled out from the sewage liquid, the object being to clean the grit by removing therefrom the admixed or encasing organic matter whereby there is recovered a clean grit without offensive or obnoxious qualities to hamper the handling and disposal thereof.

The separation of grit has become a necessary step in modern sewage treatment, for the grit is usually present in the sewage in an objectionable amount, wherein it is apt to rapidly settle out and to accumulate at inopportune points in the course of sewage treatment. The grit interferes with the digestion of the organic matter. The purpose therefore of the grit chamber and grit handling machinery is to settle out and continuously remove from the incoming sewage, the gritty matter, so as to separate this inert material from the soft and more floatable, digestible organic matter in the sewage.

In the present arrangement, the grit is moved up along an inclined path from the bottom of the grit chamber to a point of discharge. The difficulties in cleansing the grit as it leaves the grit chamber, are due to the fact that the step requires the separation of one kind of material (organic) from another kind of material (grit) and thereby differs from ordinary classifications where materials substantially differing in grain size only, and not in kind, are to be separated.

The difficulty is further explained by the fact that the individual grit particles are enveloped or encased by a more or less tenacious coat of organic sewage matter. It has been found that, in order to produce a clean grit from the chamber, the grit must not only be sufficiently agitated to remove this undesirable coat, but also that the organic matter thrown into suspension must be removed before it has a chance to re-coat the grit particles.

This can be done by having an induced liquid current or relative liquid movement sweep the organic matter away from the grit in its zone of emergence from the liquid. Hence the point of grit emergence is a critical one, and without providing sufficient relative movement of the liquid in that zone, suspended organics are liable to re-attach themselves to the emerging grit.

One feature of the invention, therefore, is to provide means for setting up and controlling a liquid current in the grit cleansing zone for the removal of the suspended organics and recovering clean grit. The organics are thereby immediately withdrawn in the critical zone of separation at the point of grit emergence from the liquid. Accumulation of organic matter in the area of grit discharge is avoided, and the remixing thereof with the grit is precluded.

This is accomplished by moving the grit from the bottom of the grit chamber through and out of what may be called an inclined cleansing column to a point of discharge, and allowing part or all of the sewage effluent to escape through that column, overflowing from the top thereof to discharge.

A preferred embodiment provides a trough-like structure extending across the upward sloping path of the grit and serving as a sewage effluent collecting chamber. The space underneath the trough represents the grit cleansing column. The sides of the trough may be in the way of adjustable overflow weirs, to control the rate of sewage overflow resulting from the cleansing column, and from the sewage chamber respectively. In other words, by varying the differential elevation between the sewage effluent overflow and the cleansing column overflow, the rate or ratio of the flows can be controlled.

The grit conveying means may be suspended from the top of the chamber and suitably arranged not to interfere with the trough.

For proper cleansing or scrubbing of the grit, it is desirable to use grit conveying means which imparts a step-wise impulse to the grit, causing appropriate alternating surge and drop of the liquid in the cleansing column which has been found to be of great importance in producing cleanliness of the emerging grit.

To more fully explain my invention, I have selected the best embodiment, thereof, of which I am at present informed and illustrate it in the accompanying drawings in which Fig. 1 shows in somewhat diagrammatic vertical longitudinal cross section, a general arrangement of the grit chamber, including an endless belt as one embodiment in the way of the grit conveying and cleansing means, and additional scrubbing and washing means.

Fig. 2 shows another embodiment of the grit conveying and scrubbing means in the form of an endless scraper belt operating upon the bottom of the chamber, and a classifier rake mechanism to scrub and elevate the grit and Fig. 3 is a diagrammatic detail showing a cross section of the collecting and discharge trough and the arrangement of adjustable weirs.

According to the embodiment in Fig. 2, a longitudinal grit chamber 10 is formed with a sloping end or deck 11, upon which is raked to a point of discharge D, the grit which settles upon the bottom of the chamber. An endless band or belt scarper is indicated at 12, conveying the grit over the bottom towards the discharge end. By suitable arrangement, for instance, a small pit 13, the settled matter is conveyed into the reach of reciprocating rakes 14 operating on said incline 11. This reciprocating rake mechanism can be of the familiar Dorr type as found in well known Dorr classifiers. The rakes are suspended by suitable pairs of hangers 15 and 16 at the upper and lower ends thereof respectively. Suitable rake driving mechanism is shown to be mounted at the top of the tank.

The drive is of the familiar Dorr type with levers, links and rocker arms and needs no detailed description. It is sufficient to say that the reciprocating movement of the rakes advance the settled solids stepwise up the incline to discharge. The stepwise movement efficiently scrubs and cleanses the grit, so as to disassociate the sewage matter from the grit, prior to the separation of grit and organics in the zone of grit emergence D, the oscillating surge of the liquid from the reciprocating rake movement being of paramount influence upon the delivery of a clean grit.

Above the rakes and substantially parallel thereto, extends from side to side of the tank or chamber 10 an inclined weir or baffle plate 18 forming a cleansing liquid column C therebetween. Plate 18, together with an upright plate 19, forms a trough 20 across the discharge end of the chamber, and communicates with a sewage effluent duct indicated by the opening 21. Each side or edge of the trough may serve as an overflow weir for the sewage liquid. Each weir is formed by an adjustable plate 22 and 23 respectively, whereby the rate of flow over each side or weir into the trough may be adjusted. The adjustable portions of the trough are indicated diagrammatically by the slidable plates 22, 23. It should of course be understood that the details of the trough and adjustable weirs might be modified in suitable ways.

One alternative of the adjustment, according to Fig. 2, shows the vertical weir substantially controlling the sewage level in the tank while the other inclined weir is raised to an extent permitting a minor portion to overflow at this point. This overflow may be the one caused by the surge from the reciprocating rakes. Provision for additional wash is indicated in the form of a spray pipe 24. The larger portion of the sewage passes over the vertical weir and is indicated by a plurality of arrows, while the smaller overflow at the inclined weir is marked by a single arrow.

Fig. 1 shows a modification to accomplish the same results in grit removal as the structure of Fig. 2. A continuous or endless scraper belt 25 collects the grit settling in the chamber 10 and convey it over the bottom and on up the incline through the liquid column C to the point of discharge D. The belt may be given reciprocating movement by which the grit is advanced stepwise, which stepwise movement effects a better scrubbing and cleaning of the grit as it moves to discharge D. Such reciprocating movement of the endless scraper belt may be obtained by supporting and driving the belt through eccentrically mounted sprockets 26. Additional washing and scrubbing means may be provided as indicated, the use of which is optional according to requirements, and which are described as follows:

As the grit moves upwardly, it passes through a scrubbing zone or trough 27, which has a wash water feed pipe 28 with a controlling valve 29 and is associated with an agitator or scrubber 30. There are also provided water pressure zones 31 and 32 with an individual feed valve 32a and 32b each of which are for forcing wash water into the grit cleaning column from below. A spray pipe 33 is located above the emerging grit. It is understood that all these expedients are more or less diagrammatic, and that they are meant to illustrate the idea of scrubbing the grit effectively prior to separating the suspended organisms from the grit through the proper control of liquid flow.

The modification of Fig. 1 shows another manner of weir adjustment to the effect that all sewage liquid passes over the inclined weir 34, of the trough, while the vertical weir 35, of the trough 36 is raised well above the liquid level. This adjustment may be required when the sewage supply drops very low as it does sometimes due to seasonal fluctuations in order to maintain the required liquid movement in the cleaning column.

An adjustment, intermediate of the two extremes of Figs. 1 and 2, is shown in Fig. 3 where portions of the sewage liquid, flow over each side of trough. The weirs may be adjusted according to the special requirements of operation.

In the operation of the present example of a sewage chamber, the sewage enters at one end of the longitudinal grit settling chamber 10, and discharges at the other end D. During its passage through the grit chamber, the grit together with a certain intermixed amount of sewage matter, forms a sediment upon the bottom of the chamber 10, with the grit being embedded in or coated with the other sewage matter.

By suitable conveying means such as the endless scraper belt 12, this mixture of settled grit and sewage is brought to the foot of the sloping deck 11, of the grit chamber and into the reach of the means for cleansing and scrubbing the grit on its journey up the slope. If, according to Fig. 2, the inclined weir plate or baffle 18, is set relatively high, the bulk of the liquid will overflow the vertical weir 22 opposite. The trough 20, forms with the bottom of the tank a passage for the grit, which comprises the grit cleansing liquid column C. In this passage, the sewage clinging to the grit is effectively thrown into suspension by the reciprocating or vibrating action of the classifier rakes 14, as the latter, by their vigorous scrubbing action, force the coating off the grit particles.

It has been indicated in a diagrammatic way in Fig. 3, how the tenacious organic coat is gradually scrubbed off, by showing in the lower portions of the cleansing column, sewage having a grit nucleus, while in the higher portion of the column, the sewage coat is separated from the grit and the removed sewage particles go into suspension. Reverting to Fig. 2 the suspended solids and whatever floatable matter they contain, pass in a relatively smaller flow as indicated by a single arrow, over the inclined weir 23, into the discharge trough 20, and are thus immediately removed from the zone of separation. This induced flow in the grit discharge zone may be caused by the additional wash liquid, for instance the spray 24, which rinses the emerging grit, as well as by the surging action from the reciprocating rakes.

The surging effect, that is the alternating rise and fall of the liquid level in the column produced as the rakes reciprocate, has been found to be of great importance for the production of a clean grit.

That is, as each blade or rake of the conveyor 25 of Fig. 1, or classifier 14 of Fig. 2 emerges from the liquid, it carries up in front of it a certain amount of liquid somewhat in the form of a wave to a level above the normal liquid level. When the blade clears the liquid, the wave or super-elevated bit of liquid tends to seek its level again which results in a liquid flow or surface current toward the overflow weir 34.

This surging or intermittent liquid level super-elevation increases the relative movement between the liquid and the emerging grit so that the suspended organic matter immediately above the grit is washed or carried away to discharge over the overflow weir. The separated mater is thus prevented from reattaching itself to the grit, which latter is allowed to emerge in a clean condition for further disposal.

However, when operating according to Fig. 1, a rather rapid flow of liquid is discharged directly over the inclined weir 34, into the trough 36, which removes immediately all suspended organic matter from the grit discharge zone. Additional wash may or may not be applied.

The modification in Fig. 1 employs an endless belt 25, with scraper elements for conveying the grit from the bottom of the grit chamber to the discharge point. By mounting this conveyor upon the eccentric sprockets 26, or the like, the belt is given a transverse reciprocating movement which gives the grit a stepwise advance, approaching the effect of the above described classifier rakes of Fig. 2. There will also be in this specific embodiment, an additional separating effect, due to the stepwise movement of the grit beginning already upon the flat bottom of the grit chamber.

To make up further for the more vigorous scrubbing action of the classifier rakes, Fig. 1 shows diagrammatically indicated thereon, the scrubbing trough 30, while the induced flow in the zone of grit emergence from the liquid is indicated by the liquid pressure chambers 31 and 32 and the spray pipe 33.

Depending upon the rate of sewage flow, it may be desirable to utilize only a part of the sewage liquid for discharging the same together with the suspended organics over the inclined weir, while the other part of the sewage passes out over the other weir. The rate of partial discharge over the inclined side may be so controlled as to prevent inert solids of intermediate size from being swept into the trough when they should go to the grit discharge. This also may or may not be operated with additional wash, or hydraulic effect.

From the foregoing, it will be seen that the object of discharging a clean grit is obtained either by controlling the rate of liquid flow away from the point of grit emergence, or by applying a suitable wash, or to combine both measures to obtain desirable flow conditions for the organics removal. Mechanically, this is accomplished by the simple arrangement of some equivalent of an organics removing trough at the grit discharge end and forming a grit cleansing column underneath.

The operation of the grit chamber includes three distinct functions, to wit, first, sedimentation, that is the settling of grit plus some sewage matter in the tank, second, disassociation or separation, that is freeing the grit from encasing sewage matter in the cleansing column, and third, elimination or independent removal, that is the withdrawal of clean grit on the one hand, and scrubbed off or washed off sewage matter on the other hand in the zone of grit emergence.

It is to be understood that whereas I have described certain embodiment of my invention, other embodiments and changes of detail are possible without departing from the spirit of my invention.

I claim:

1. Apparatus capable of treating sewage wherein there is a sedimentation chamber, and an arrangement for treating solids sedimented in said chamber to free grit from organic sewage matter comprising a partially submerged inclined deck, a partially submerged conveyor for carrying said sedimented solids upwardly along said deck, an overflow fluid collector extending transversely over said conveyor and provided with an outlet forming with the inclined deck a restricted space for an agitated liquid column in which to disassociate the grit from the sewage, and means for inducing a current flow in said liquid column effective to float sewage organic solids separately from the top zone of said column into said overflow collector whereby said organic solids are prevented from remixing themselves to the grit in the zone of emergence.

2. The apparatus of claim 1 in which the overflow fluid collector comprises a wall substantially parallel to the inclined deck, forming therewith the confines of the liquid column.

3. The apparatus of claim 1 in which the overflow fluid collector is provided with adjustable weir means for adjusting the overflow capacity to the collector.

4. The apparatus of claim 1 in which the overflow fluid collector is provided with an adjustable weir at each side, allowing to apportion desired amounts of overflow to each side.

GEORGE G. HYDE.